US 6,626,211 B2

(12) United States Patent
Mizutani et al.

(10) Patent No.: US 6,626,211 B2
(45) Date of Patent: Sep. 30, 2003

(54) BRAKE HOSE

(75) Inventors: Satoshi Mizutani, Aichi-ken (JP);
Kenichiro Furui, Aichi-ken (JP); Taizo Ogawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/302,985

(22) Filed: Nov. 25, 2002

(65) Prior Publication Data

US 2003/0098082 A1 May 29, 2003

(30) Foreign Application Priority Data

Nov. 27, 2001 (JP) ................................. P2001-360375
Nov. 27, 2001 (JP) ................................. P2001-360379

(51) Int. Cl.[7] ............................................. F16L 11/10
(52) U.S. Cl. .................... 138/126; 138/137; 138/140
(58) Field of Search ........................... 138/126, 124, 138/137, 140, 141, 146

(56) References Cited

U.S. PATENT DOCUMENTS

| 3,918,499 | A | * | 11/1975 | Higbee ........................ 138/125 |
| 3,948,293 | A | * | 4/1976 | Bixby ......................... 138/126 |
| 4,759,388 | A | | 7/1988 | Kiyama et al. ............... 138/130 |
| 5,077,108 | A | * | 12/1991 | Ozawa et al. ............... 428/36.2 |
| 5,445,191 | A | * | 8/1995 | Green et al. ................ 138/126 |
| 5,526,848 | A | * | 6/1996 | Terashima et al. ........... 138/125 |
| 5,655,572 | A | * | 8/1997 | Marena ....................... 138/125 |
| 5,660,210 | A | * | 8/1997 | Ikeda et al. ................ 138/126 |
| 6,220,304 | B1 | * | 4/2001 | Horiba et al. ............... 138/126 |

FOREIGN PATENT DOCUMENTS

| EP | 0559169 A1 | 9/1993 |
| EP | 0982523 A2 | 3/2000 |
| EP | 1156252 A1 | 11/2001 |
| GB | 1515564 | 6/1978 |
| JP | 06-201076 | 7/1994 |
| JP | 2000-046255 | 2/2000 |
| WO | WO 01/48412 A1 | 7/2001 |

* cited by examiner

*Primary Examiner*—Patrick Brinson
(74) *Attorney, Agent, or Firm*—Posz & Bethards, PLC (57) ABSTRACT

A brake hose includes two reinforcing layers in a rubber base. The brake hose comprises an inner tube rubber layer having a flow path for flowing fluid, a lower yarn layer formed by braiding first yarns around the inner tube rubber layer and an upper yarn layer formed by braiding second yarns around the lower yarn layer and a cover rubber layer covering the upper yarn layer. A lower yarn layer duty LD given by the equation, $LD(\%)=(LRP/PRP)\times 100$, has a value of 50–65%, where LRP denotes an inner pressure at which a brake hose without the upper yarn layer and the cover would burst, and PRP denotes an inner pressure at which the brake hose would burst.

13 Claims, 10 Drawing Sheets

| | | EMBODIMENT | COMPARISON EXAMPLE 1 | COMPARISON EXAMPLE 2 | COMPARISON EXAMPLE 3 |
|---|---|---|---|---|---|
| LOWER YARN LAYER | YARN TYPE | POLYESTER | POLYESTER | POLYESTER | POLYESTER |
| | TENSILE STRENGTH (g·Dtex) | 8.7 | 8.7 | 9.0 | 8.7 |
| | ELONGATION (%) | 14 | 14 | 10 | 14 |
| | ELONGATION AT 2.7g LOAD (%) | 4 | 4 | 2.7 | 4 |
| UPPER YARN LAYER | YARN TYPE | VINYLON | VINYLON | VINYLON | POLYESTER |
| | TENSILE STRENGTH (g·Dtex) | 9.0 | 8.3 | 8.3 | 8.7 |
| | ELONGATION (%) | 7.5 | 10 | 10 | 14 |
| | ELONGATION AT 2.7g LOAD (%) | 2.9 | 3.5 | 3.5 | 4 |

Prior Art

BRAKE HOSE

This application claims the benefit of and priority from Japanese Applications No. 2001-360375 filed Nov. 27, 2001 and No. 2001-360379 filed Nov. 27, 2001, the content of which are incorporated herein by reference.

BACKGROUND OF THE INVENTION

1. Field of the Invention

The present invention pertains to a brake hose having two reinforcing yarn layers including a lower yarn layer and an upper yarn layer in a rubber base.

2. Description of the Related Art

Figure 16:
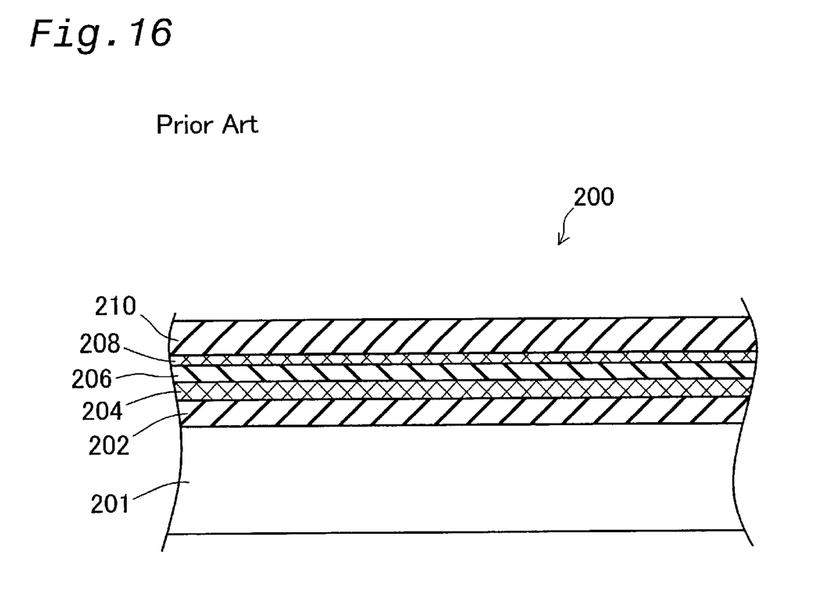
FIG. 16 is a half-sectional view showing the brake hose of the prior art.

A brake hose known in the conventional art is shown in FIG. 16 (JP 06-201076A). FIG. 16 is a cross-section of the main components of a conventional brake hose 200. Because the brake hose 200 must have high resistance against brake fluid pressure, it is formed from several layers of rubber and fiber yarn. The brake hose 200 comprises an inner tube rubber layer 202, a lower yarn layer 204, an intermediate rubber layer 206, an outer yarn layer 208, and a cover rubber layer 210.

The brake hose 200 is required to meet a higher pressure resistance standard than a coolant system hose or a fuel system hose. As fluid temperatures and pressure levels of automobile system have increased in recent years, the demand for higher pressure resistance has increased as well.

The pressure from the pressure fluid flowing in the flow path 201 inside the brake hose 200 is transmitted from the inner circumference area of the brake hose 200 to the outer circumference area thereof. In other words, the pressure is transmitted to the inner tube rubber layer 202, the lower yarn layer 204, the intermediate rubber layer 206, the upper yarn layer 208 and the cover rubber layer 210, causing each layer to expand. Each layer has a binding force that operates against the pressure exerted by the pressure fluid and inhibits expansion of such layer. The inner tube rubber layer 202, the intermediate rubber layer 206 and the cover rubber layer 210 are highly elastic, and are responsible for no more than 10% of the total binding force, while the majority of the binding force is possessed by the lower yarn layer 204 and the upper yarn layer 208. Consequently, increasing the binding force of the lower yarn layer 204 and the upper yarn layer 208 increases the durability and expansion resistance (i.e., resistance to cubical expansion) provided by the brake hose 200. As a result, increasing both of these characteristics by changing the type of yarn material used and the braiding method of the yarn layers has been examined.

SUMMARY OF THE INVENTION

An object of the present invention is to provide a brake hose that offers increased durability and expansion resistance.

In accordance with one embodiment of the present invention, a brake hose includes two reinforcing layers in a rubber base. The brake hose comprises an inner tube rubber layer having a flow path for flowing fluid, a lower yarn layer formed by braiding first yarns around the inner tube rubber layer and an upper yarn layer formed by braiding second yarns around the lower yarn layer and a cover rubber layer covering the upper yarn layer. A lower yarn layer duty LD given by the equation, LD(%)=(LRP/PRP)×100, has a value of 50–65%, LRP denotes an inner pressure at which a brake hose without the upper yarn layer and the cover would burst, and PRP denotes an inner pressure at which the brake hose would burst.

In the brake hose pertaining to the present invention, the pressure exerted by the pressure fluid flowing in the flow path is transmitted from the inner circumference area of the brake hose to the outer circumference area thereof, i.e., from the interior of the rubber base to the lower yarn layer and the upper yarn layer, causing each such layer to expand. A binding force that restricts the expansion of the brake hose in resistance to the pressure from the pressure fluid is generated. The rubber base is responsible for no more than 10% of the total binding force due to its high elasticity, while the majority of the binding force is exerted by the lower yarn layer and the upper yarn layer.

Because the fluid pressure transmitted in this fashion travels from the inner circumference area to the outer circumference area of the brake hose in a radial fashion, the fluid pressure diminishes per unit area as it travels to the outer circumference area, and the lower yarn layer in the inner circumference area of the brake hose receives a larger amount of expansion force than the upper yarn layer. As a result, where the lower yarn layer and the upper yarn layer are formed from yarn made of the same material, the yarn of the lower yarn layer receives a greater tensile force than the yarn of the upper yarn layer. This means that even where the first yarns bursts after receiving a large amount of tensile force, there is still some degree of margin or leeway before the second yarns bursts. In view of this fact, the percentage burden assumed by the lower yarn layer is set at 50–65% of the total burden. In other words, the percentage burden assumed by the second yarns is set to a value larger than in a conventional brake hose, while the burden assumed by the first yarns is reduced. Consequently, the burden on each individual strand of yarn becomes smaller, and the ultimate rupturing pressure that may be applied to the brake hose can be increased.

The percentage burden assumed by the lower yarn layer is set to 50–65% because the first yarns and second yarns must satisfy prescribed levels of tensile strength and elongation. Therefore, a material such as vinylon, polyethylene terephthalate, polyethylene naphthalate or rayon is used, for example, because it would be difficult as a practical matter to set the percentage burden to be assumed by the lower yarn layer at less than 50% using these yarns, while if the lower yarn layer percentage burden were to exceed 65%, the higher rupturing pressure that comprises one characteristic of the present invention could not be obtained.

It is preferred that the second yarns of the upper yarn layer has a lower elongation than the first yarns of the lower yarn layer. Because the upper layer yarn is less subject to elongation when subjected to tensile force, it can handle a large amount of force up to the point at which the lower yarn layer expands and bursts.

For example, yarn having a tensile strength of 8.5 g per decitex and a elongation of 3.0±1% at a tensile load of 2.7 g can be used for the second yarns, and yarn having a tensile strength of 6.5 g per decitex and a elongation of 3.5±1% at a tensile load of 2.7 g can be used for the first yarns. A decitex is a unit of measurement that expresses the weight(2) of a fiber relative to its length, and is equal to one gram per 10,000 meters of yarn.

The brake hose according to another aspect of the present invention comprises an inner tube rubber layer that has a flow path in which a pressure fluid flows and is formed from a rubber material, a lower yarn layer formed via braiding of first yarns around this inner tube rubber layer, an upper yarn layer that is formed via braiding of second yarns around this lower yarn layer, and a cover rubber layer that is formed around this upper yarn layer. The lower yarn layer is formed from first yarns strands that have on the surface thereof an adhesive thin film formed via RFL processing and a rubber thin film composed of EPDM that adheres to the adhesive thin film and the inner tube rubber layer, such layers formed in a sequential order. EPDM refers to ethylene-a-olefin-unconjugated diene copolymer (propylene as a-olefin).

The above-mentioned first yarns comprises a filament bundle composed of bundled filament threads, on each of which is formed an undercoat layer using an epoxy primer process. The above-mentioned adhesive thin film and rubber thin film are sequentially applied to the outer surface of each filament bundle.

The above-mentioned first yarns comprises a filament bundle composed of bundled filament threads. An undercoat is formed on the outer surface of each filament bundle using an epoxy primer process, and an adhesive thin film and rubber thin film are then applied over the undercoat.

In the brake hose pertaining to the present invention, the lower yarn layer and the upper yarn layer formed around the inner tube rubber layer form two reinforcing yarn layers inside the rubber base, and give the brake hose sufficient strength to withstand the high pressure of the pressure fluid flowing within the flow path. Furthermore, the first yarns constituting the lower yarn layer includes an adhesive thin film formed via RFL processing and a rubber thin film. The rubber thin film adheres to the inner tube rubber layer and prevents yarn displacement, increases the solidity of the lower yarn layer by causing the strands of the first yarns to adhere to each other at areas where they overlap, which prevents the inner tube rubber layer from expanding due to internal pressure, thereby limiting the amount of cubical expansion of the brake hose and improving the feel of the brake. The adhesive thin film formed via RFL processing is formed in order to cause the first yarns to adhere to the rubber thin film formed from EPDM. In RFL processing, an adhesive thin film that operates as an adhesive and is formed mainly from resorcinol-formaldehyde-latex resin and rubber latex is applied to the surface of each yarn strand.

In the brake hose according to another aspect of the present invention, because an intermediate rubber layer is not formed around the lower yarn layer, the process of forming the intermediate rubber layer can be omitted. As a result, when a manufacturing run of brake hoses is produced, the significant amount of floor space required for forming the intermediate rubber layer is no longer required.

In a preferred embodiment of the first yarns, a filament bundle is formed by bundling together several hundred filament threads, over each of which is formed an undercoat layer using an epoxy primer process, and then forming over the filament bundle a layer formed via RFL processing and an EPDM layer. The lower yarn layer is then formed by braiding the first yarns around the inner tube rubber layer. In this case, because the filament threads adhere strongly to each other due to the undercoat layer, the penetration of air or brake fluid between the filament threads can be prevented more effectively.

In another preferred embodiment of the first yarns, a filament bundle is formed by bundling together filament threads, an undercoat is formed on the outer surface of the filament bundle using an epoxy primer process, and an adhesive thin film and a rubber thin film are sequentially formed over the undercoat layer. In this case, because the epoxy primer process is not performed for each individual filament thread, and is instead carried out for the filament bundle as a whole, manufacturing efficiency can be improved.

DESCRIPTION OF THE PREFERRED EMBODIMENTS

A. First embodiment (1) Basic Construction of Brake Hose 10

Figure 1:
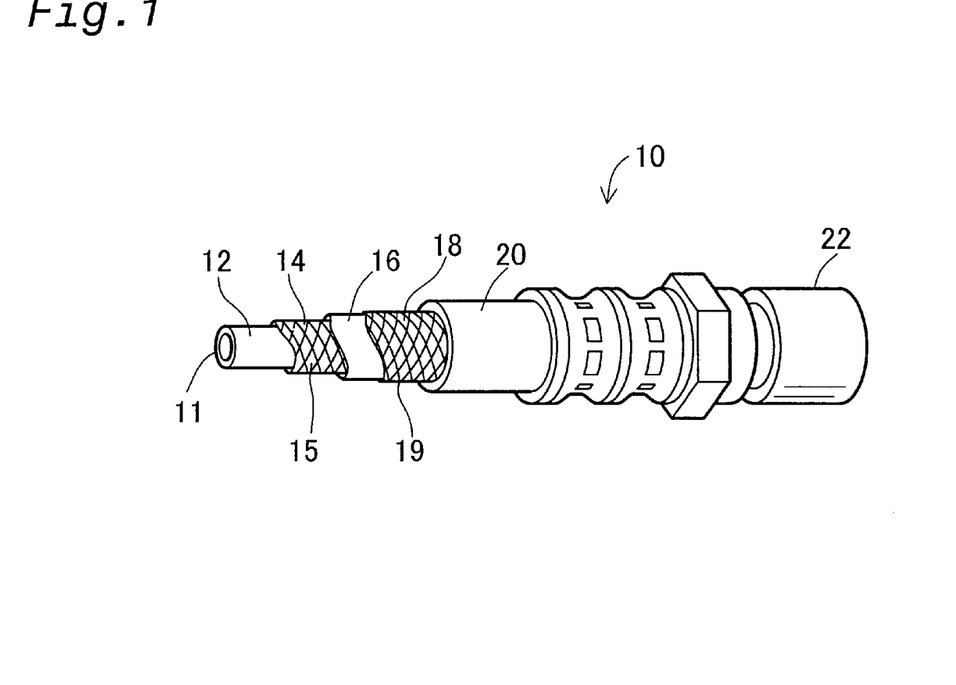
FIG. 1 is a partial cutaway perspective view of the brake hose pertaining to a first embodiment of the present invention.
Figure 2:
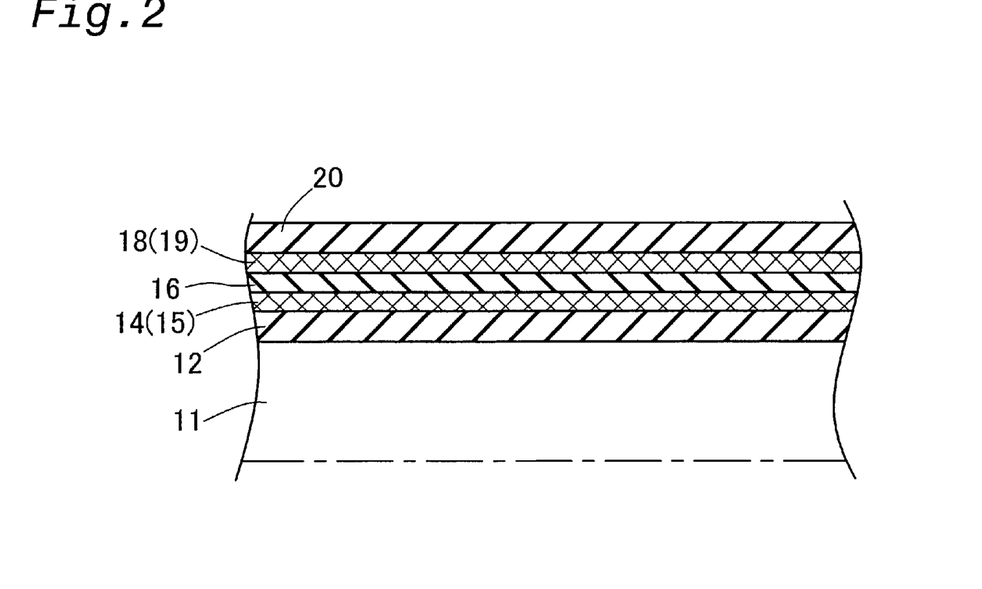
FIG. 2 is a half-sectional view of the main components of the brake hose.

FIG. 1 is a partial cutaway perspective view of a brake hose 10 pertaining to a first embodiment of the present invention. FIG. 2 is a partial cross-sectional view of the brake hose 10. With reference to FIG. 1 and FIG. 2, the brake hose 10 is used in order to connect a master cylinder used to carry out hydraulic braking in an automobile not shown in the figures to a hydraulic device mounted near each tire, and comprises five layers in order to withstand the brake fluid pressure. The brake hose 10 includes an inner tube rubber layer 12 having a flow path 11, a lower yarn layer 14, an intermediate rubber layer 16, an upper yarn layer 18, and a cover rubber layer 20. A mouthpiece 22 is fixed to an end of the brake hose 10 via caulking.

(2) Construction of Various Layers of the Brake Hose 10

In order to give the brake hose such properties as pressure resistance against the brake fluid pressure of up to 50 MPa, durability and expansion resistance, the materials, thickness and other parameters of each layer are to established.

(2)-1 Inner Tube Rubber Layer 12

Primarily in order to achieve oil resistance, the inner tube rubber layer 12 is made of ethylene-propylene-diene copolymer rubber (EPDM), styrene-butadiene rubber copolymer (SBR) or the like, and has an inner diameter of 3.0–3.4 mm and a thickness of 0.5–1.0 mm.

(2)-2 Lower Yarn Layer 14

The lower yarn layer 14 comprises a wound yarn including two or three strands of a fiber such as vinylon, polyethylene terephthalate, polyethylene napthalate or rayon, and is formed by braiding the yarn around the inner tube rubber layer 12 using a braid count of 20 count or 24 count. A braid count of 20 count or 24 count means that the yarn is drawn from bobbins located at 20 or 30 locations and braided around the inner tube rubber layer 12, as described below.

Based on the relationship to the percentage burden borne by the upper yarn layer described below, it is preferred that the lower yarn of the lower yarn layer constitute a yarn having a tensile strength of 6.5 g or more per decitex and a elongation of 3.5±1% at a tensile load of 2.7 g.

(2)-3 Intermediate Rubber Layer 16

The intermediate rubber layer 16 is a layer intended to prevent displacement of the lower yarn layer 14 and the upper yarn layer 18. The upper yarn layer 18 is formed by winding a sheet made from a rubber material around the lower yarn layer 14 or by applying rubber cement onto the lower yarn layer 14.

As the rubber material for the sheet, EPDM, isobutylene-isoprene copolymer rubber (IIR) or natural rubber (NR) may be used. Using EPDM or IIR or a material comprising a mixture of the two permits a higher heat resistance because of the properties of such materials.

It is preferred that the Mooney viscosity of the intermediate rubber layer 16 be 10–40 Mv (minimum Mooney value) at 145° C. The Mooney viscosity is a value reflecting measurement of the viscosity of non-vulcanized rubber at 145° C. based on the K6300 test promulgated under JIS (Japanese Industrial Standards). The Mooney viscosity is set to the above range in order to ensure that the intermediate rubber layer 16 fills in the gaps between the strands of the lower yarn 15 and the strands of the upper yarn 19, thereby preventing displacement of the lower yarn layer 14 and the upper yarn layer 18. When a sheet material having a Mooney value of 10–40 Mv (minimum Mooney value) at 145° C. is used in order to increase the effect of the intermediate rubber layer 16, the intermediate rubber layer 16 fills in the gaps between the strands of the lower yarn of the lower yarn layer 14 and the strands of the upper yarn of the upper yarn layer 18 when the upper fiber layer 19 is braided, thereby inhibiting displacement of the yarn of the lower yarn layer 14 and the upper yarn layer 18. Therefore, when internal pressure is generated, there is minimal displacement of the yarn of the lower yarn layer 14 and the upper yarn layer 18, and durability and cubical expansion resistance can be improved. The Mooney viscosity for the rubber material used for the intermediate rubber layer 16 may be adjusted by, for example, changing the type of carbon added to the rubber material.

It is preferred that the intermediate rubber layer 16 have a thickness of 0.1–0.25 mm. This is because if the thickness is less than 0.1 mm, the intermediate rubber layer 16 becomes too thin and cannot be braided to around the lower yarn layer 14, while if the thickness exceeds 0.25 mm, the intermediate rubber layer is so thick that the intermediate rubber layer 16 functions as an elastic layer that permits displacement of the lower yarn layer 14, and the displacement-inhibiting effect of the lower yarn layer is diminished.

Where rubber cement is used for the intermediate rubber layer 16, the Mooney value of the rubber cement is close to zero, and the above thickness is obtained by applying the rubber cement in several coats (for example, in at least three coats). The rubber cement comprises a blend of IIR and EPDM dissolved in trichloroethane.

(2)-4 Upper Yarn Layer 18

The upper yarn layer 18 is formed by braiding around the intermediate rubber layer 16 the upper yarn 19 obtained by winding together two or three fiber threads of vinylon, polyethylene terephthalate, polyethylene napthalate or rayon, using a braid count of 20 count or 24 count. The upper yarn 19 is formed by bundling together 200–400 filament threads and braiding yarn obtained by winding together two or three such filament threads using a braid count of 20 count or 24 count.

For the upper yarn 19, a yarn that has a lower elongation than the lower yarn 15, such as a yarn having a tensile strength of 8.5 g per decitex and a elongation of 3.0±1% at a tensile load of 2.7 g, can be used. Yarns made from the same material but having a different tensile force can be manufactured by subjecting the yarn to an elongation and heating process in which the yarn is pulled while being heated.

(2)-5 Cover Rubber Layer 20

Mainly in order to achieve ozone resistance, the cover rubber layer 20 is made of a material such as EPDM or a blend of EPDM and CR. The cover rubber layer 20 has a thickness of 0.5–1.0 mm.

(3) Brake Hose 10 Manufacturing Method

The manufacturing method for the brake hose 10 will now be described. The brake hose 10 can be manufactured using public-domain methods, i.e., by carrying out a rubber extrusion process, a fiber yarn braiding process and a vulcanization process.

(3)-1 Hose Manufacturing Apparatus 30

Figure 3:
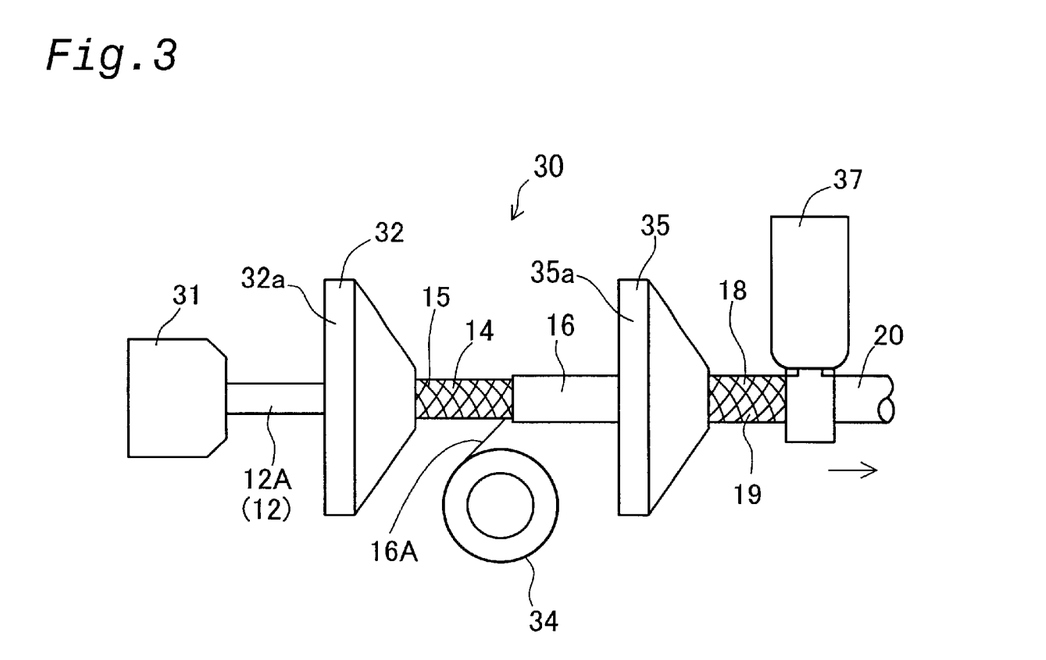
FIG. 3 shows a hose manufacturing apparatus.

FIG. 3 shows a hose manufacturing apparatus 30. With reference to FIG. 3, the hose manufacturing apparatus 30 includes a first extruding device 31, a first braiding device 32, an intermediate sheet forming device 34, a second braiding device 35 and a second extruding device 37. The first extruding device 31 is a device that forms the inner tube rubber layer 12 by extruding a rubber material. The first braiding device 32 includes bobbin carriers (not shown in the figure) mounted to a drum 32a, and forms the lower yarn layer 14 by braiding the lower yarn 15 around the extruded inner tube body 12A while drawing the lower yarn 15 from the bobbin carriers. The intermediate sheet forming device 34 draws from a roller a sheet material 16A used to form the intermediate rubber layer 16 around the lower yarn layer 14 braided by the first braiding device 32. The second braiding device 35 has a construction essentially identical to that of the first braiding device 32. The second braiding device 35 includes bobbin carriers (not shown in the figure) mounted to a drum 35a, and forms the upper yarn layer 18 by braiding the upper yarn 19 around the intermediate rubber layer 16 while drawing the upper yarn 19 from the bobbin carriers. The second extruding device 37 forms the cover rubber layer 20 by extruding a rubber material and covering the rubber material over the upper yarn layer 18.

(3)-2 Brake Hose 10 Manufacturing Process

The series of manufacturing steps by which the brake hose 10 is manufactured by the hose manufacturing apparatus 30 will now be described. First, the inner tube rubber layer 12 is formed via extrusion of a rubber material by the first extruding device 31. During this process, a mandrel (not shown in the figure) is inserted inside the inner tube rubber layer 12. Next, the lower yarn layer 14 is formed by drawing lower yarn 15 from the bobbins while the drum 32a of the first braiding device 32 rotates and braiding the lower yarn 15 around the extruded inner tube rubber layer 12. During this process, in order to braid the lower yarn layer 14 to a braid count of 20, for example, the lower yarn 15 is drawn from bobbins that are located at 20 locations and rotate in opposite directions. The intermediate rubber layer 20 is then formed by supplying the sheet material 16A from the intermediate sheet forming device 34 over the lower yarn layer 14. The upper yarn layer 18 is then braided around the intermediate rubber layer 16 by drawing upper yarn 19 from the bobbins while the drum 35a of the second braiding device 35 rotates. Finally, the cover rubber layer 20 is formed by extruding a rubber material from the second extruding device 37 over the upper yarn layer 18.

The vulcanization process is then performed. Vulcanization is carried out for 15–60 minutes at 120–170° C. Due to the heating that occurs during the vulcanization process, the RFL-processed upper yarn layer 18 and lower yarn layer 14 adhere to the inner tube rubber layer 12, the intermediate rubber layer 16 and the cover rubber layer 20. Consequently, the brake hose 10 is integrally formed.

(4) Brake Hose Operation and Effect (4)-1 Lower Yarn Layer Percentage Burden

Figure 4:
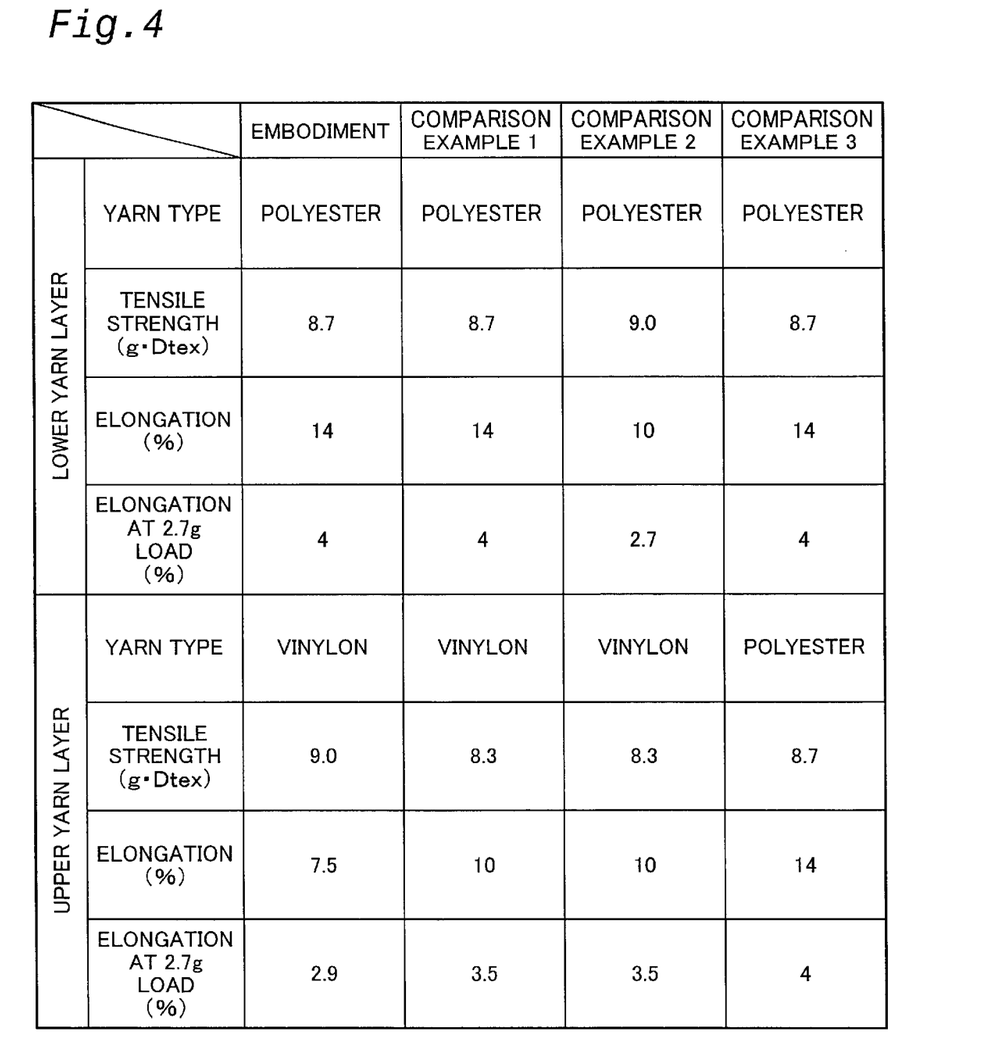
FIG. 4 shows the types of yarn in the lower yarn layer and upper yarn layer and the physical property values therefor in an embodiment 1 and in comparison examples 1–3.

Durability and expansion resistance (i.e., the amount of cubical expansion) in connection with changes in the percentage burden borne by the lower yarn layer were investigated. FIG. 4 shows the types of yarn in the lower yarn layer and upper yarn layer and the physical property values therefor in an embodiment and in comparison examples 1–3 created as test samples. Polyester (PET) fiber was used as the lower yarn, and the yarn used in the embodiment and the comparison example 1 had the same physical property values, while yarns having a different elongation and tensile strength were used in the comparison examples 2 and 3. Vinylon was used as the upper yarn in the embodiment and in the comparison examples 1 and 2, while polyester was used for the comparison example 3. Furthermore, the upper yarn used in the embodiment had a higher tensile strength and a lower elongation than the upper yarn used in the comparison examples. The other dimensions of the brake hose were as follows: the outer diameter was 10.5 mm, the length was 305 mm, the inner diameter of the inner tube rubber layer was 3.2 mm, the thickness of the inner tube rubber layer was 0.8 mm, and the thickness of the cover rubber layer was 0.8 mm. For the intermediate rubber layer, a sheet material made from 0.2 mm-thick EPDM was used.

The lower yarn layer duty was sought by (1) creating a brake hose, applying internal pressure and measuring the pressure when a burst occurred and deeming this pressure the product burst pressure, (2) measuring the pressure that caused burst when the cover rubber layer, the upper yarn layer and the intermediate rubber layer had been removed from the brake hose, and deeming this pressure the lower yarn layer burst pressure, and (3) seeking the lower yarn layer duty using the following formula:

Lower yarn layer duty (%)=(lower yarn layer burst pressure/product burst pressure)×100.

(4)-2 Durability Test

Figure 5:
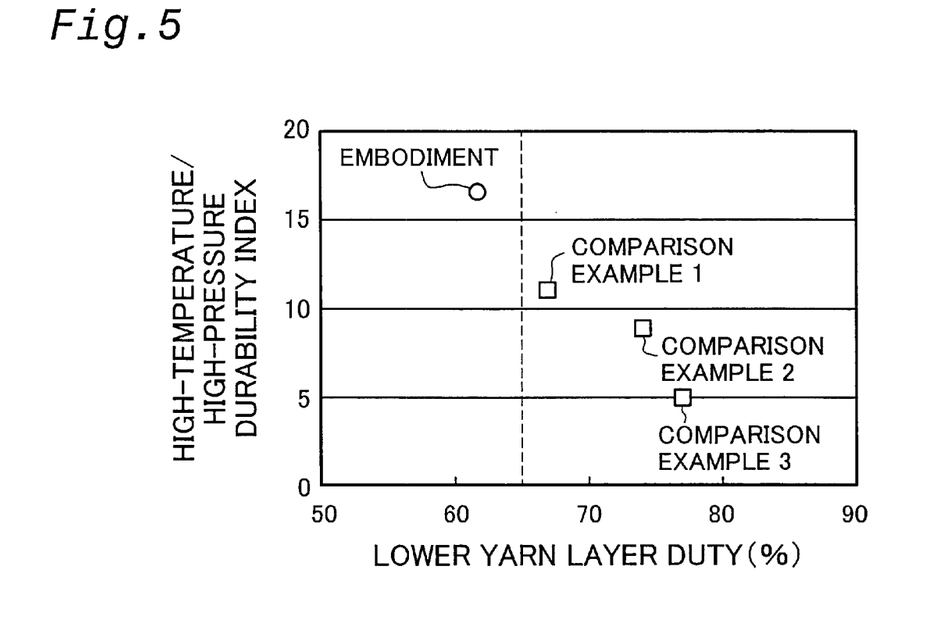
FIG. 5 is a graph showing the relationship between the percentage burden assumed by the lower yarn layer and hose durability.

The durability test was performed via repeated pressure testing in which brake fluid was actually sent through the brake hose. In other words, under an ambient temperature of 120° C., brake fluid was injected at cycles of 0.3 Hz at a fluid pressure ranging from 0 MPa to 20 MPa, and the number of injections required for product burst was determined. The results are shown in FIG. 5. In the graph of FIG. 5, the vertical axis indicates an index for the number of times fluid pressure applied, while the horizontal axis indicates the lower yarn layer duty. The burden percentage of less than 65% pertaining to the embodiment was compared with the burden percentages of 67%, 75% and 78% pertaining to the comparison examples 1, 2 and 3, respectively, from which it was determined that a burden percentage of under 65% offers improved durability. This is due to the fact that increases in the brake fluid pressure were borne by the upper yarn layer, which had a higher tensile strength and a lower elongation, whereby application of a large load on the lower yarn was avoided and the durability of the brake hose was improved.

(4)-3 Cubical Expansion Amount Test

Figure 6:
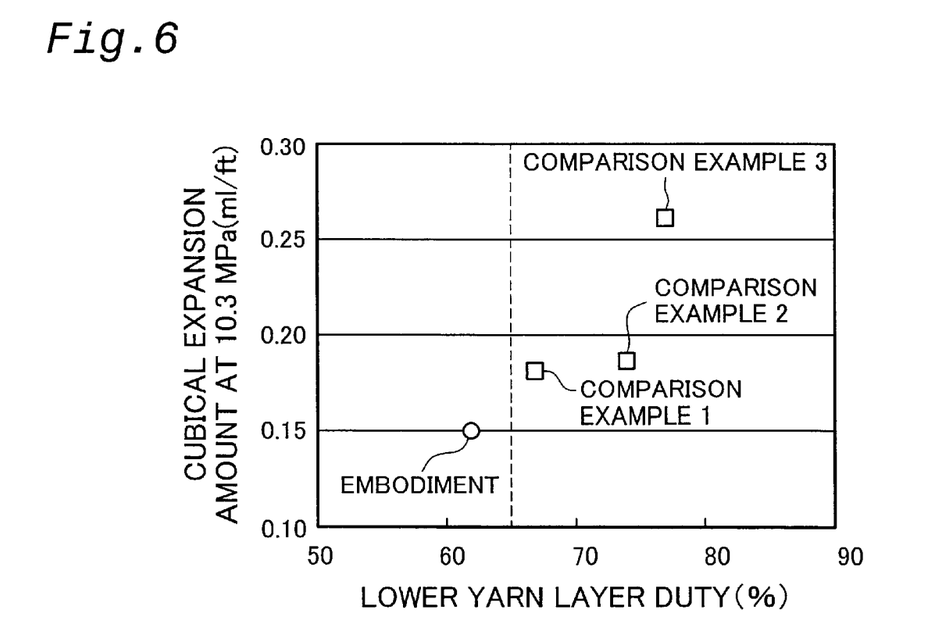
FIG. 6 is a graph showing the relationship between the percentage burden assumed by the lower yarn layer and the amount of cubical expansion.

In the cubical expansion amount test, the amount of cubical expansion was determined by measuring in accordance with JIS standard 2601 the change in the internal volume of a 305 mm-length of brake hose when oil pressure of 10.3 MPa was generated therein. The results are shown in FIG. 6. FIG. 6 is a graph in which the vertical axis indicates the amount of cubical expansion, while the horizontal axis indicates the lower yarn burden percentage. As in the durability test, it was determined that the amount of cubical expansion falls when the lower yarn burden percentage is less than 65%. This is due to the fact that increases in brake fluid pressure were borne by the upper yarn layer having a higher tensile strength and a lower elongation, i.e., the resistance of the brake hose against the expansion force was increased by the upper yarn layer, whereby the amount of cubical expansion was reduced.

A. Second Embodiment (1) Basic Construction of Brake Hose 110

Figure 7:
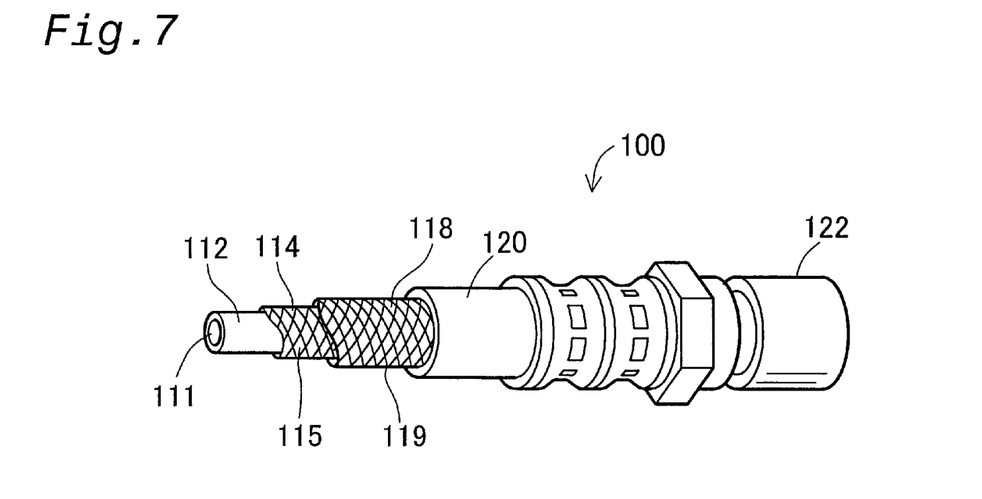
FIG. 7 is a partial cutaway perspective view of the brake hose pertaining to a second embodiment of the present invention.
Figure 8:
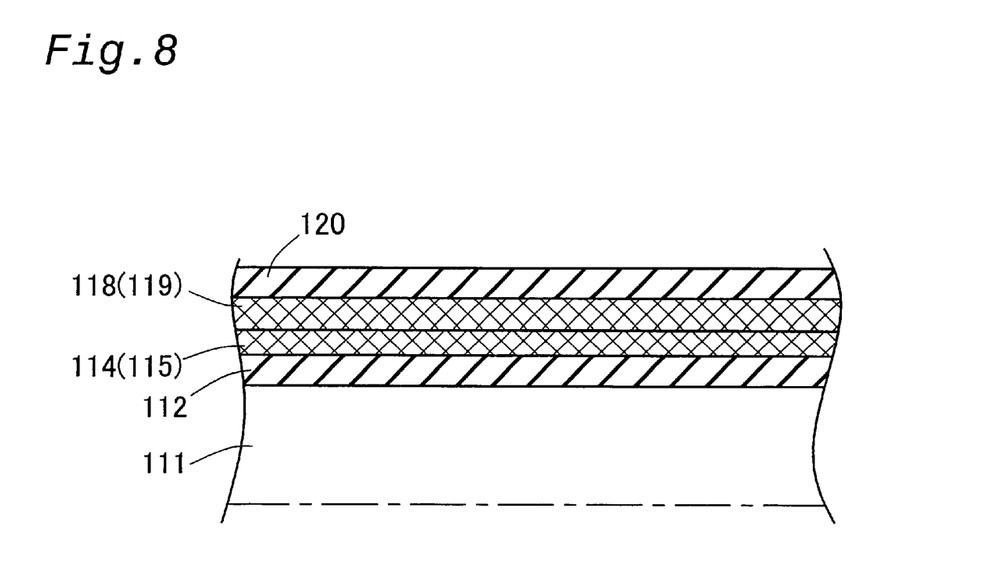
FIG. 8 is a half-sectional view of the main components of the brake hose.

FIG. 7 is a partial cutaway perspective view of the brake hose 110 pertaining to a second embodiment of the present invention, while FIG. 8 is a cross-sectional view of the main components of the brake hose 110. With reference to FIGS. 7 and 8, the brake hose 110 includes an inner tube rubber layer 112 having a flow path 111, a lower yarn layer 114 braided around the inner tube rubber layer 112, an upper yarn layer 118 braided around the surface of the lower yarn layer 114, and a cover rubber layer 120 that covers the surface of the upper yarn layer 118. A mouthpiece 122 is fixed to one end of the brake hose 110 via caulking.

(2) Construction of Various Layers of Brake Hose 110

(2)-1 Inner Tube Rubber Layer 112

Primarily in order to achieve oil resistance, the inner tube rubber layer 112 is formed from ethylene-propylene-diene copolymer rubber (EPDM), styrene-butadiene rubber copolymer (SBR) or the like, and has an inner diameter of 3.0–3.4 mm and a thickness of 0.5–1.0 mm.

(2)-2 Lower Yarn Layer 114

The lower yarn layer 114 comprises a wound yarn composed of two or three strands of a fiber such as vinylon, polyethylene terephthalate, polyethylene napththalate or rayon, and is formed by coating the yarn with an adhesive and a rubber layer and braiding the yarn around the inner tube rubber layer 112 using a braid count of 20 count or 24 count.

Figure 9:
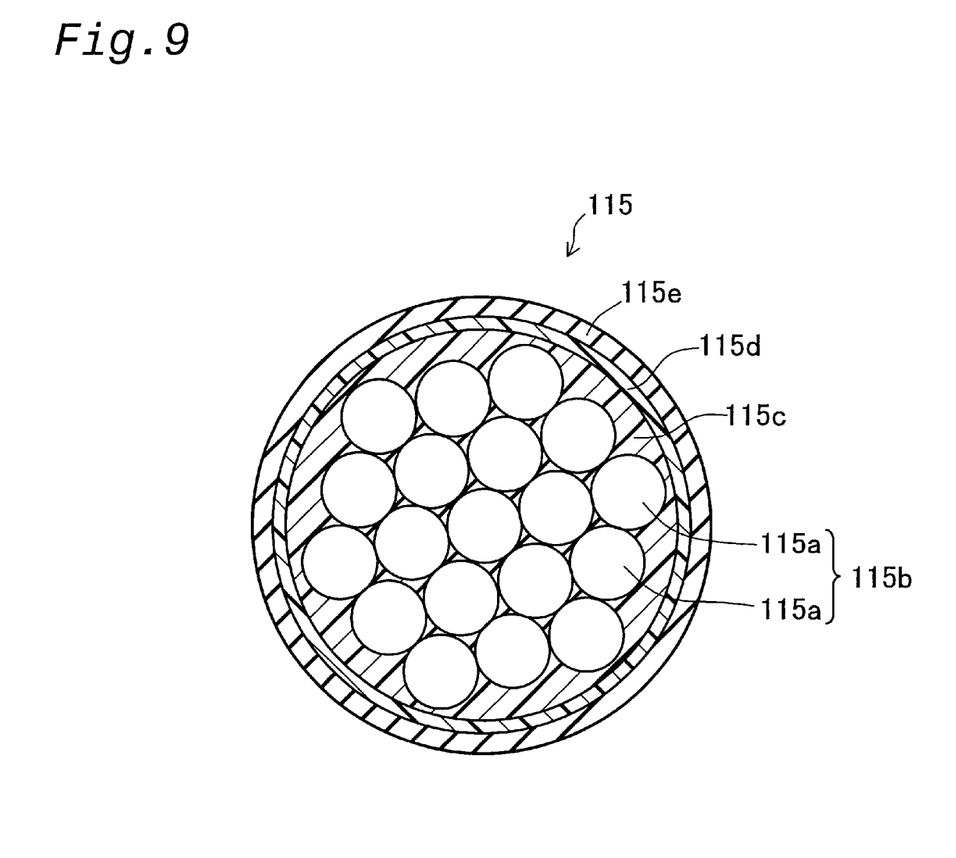
FIG. 9 shows an expanded cross-section of the lower yarn.

FIG. 9 is an explanatory drawing showing an expanded cross-section of the lower yarn 115. The lower yarn 115 comprises a filament bundle 115b composed of 250–400 bundled filament threads 115a, an undercoat layer 115c that is applied to the outer surface of the filament bundle 115b, an adhesive thin film 115d formed around the filament bundle 115b, and a rubber thin film 115e formed around the adhesive thin film 115d. In FIG. 9, the filament bundle 115b is represented by only a small number of filament threads 115a for simplification purposes. The undercoat layer 115c is formed from epoxy resin in order to ensure adherence between the filament threads 115a and the adhesive thin film 115d. The adhesive thin film 115d is RFL-processed in order to ensure adherence between the undercoat layer 115c and the rubber thin film 115e. The rubber thin film 115e is a rubber layer formed from EPDM and serves to ensure adherence between the adhesive thin film 115d and the inner tube rubber layer 112 and to prevent displacement or abrasion of the lower yarn 115.

Figure 10:
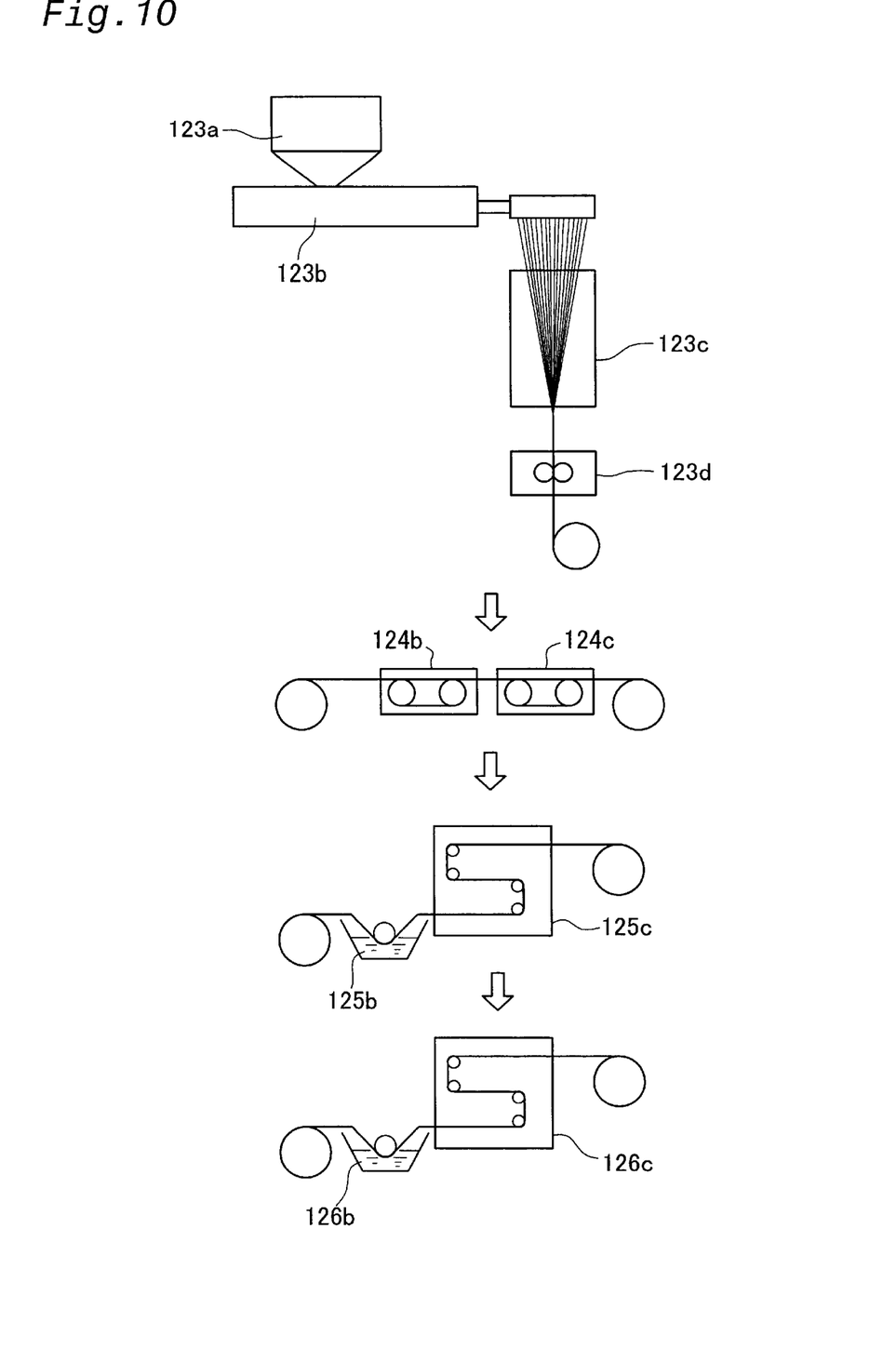
FIG. 10 shows the processes used to produce the lower yarn.

The lower yarn is manufactured according to the processes described below. FIG. 10 is an explanatory drawing describing the processes used to manufacture the lower yarn 115. First, a hopper 123a is filled with polyester resin, filament threads are extruded by an extruder 123b, and these filament threads are bundled together while passing through a cooler 123c. This forms a filament bundle 115b composed of approximately 250–400 bundled filament threads 115a. The filament bundle 115b then passes through an undercoating apparatus 123d and receives a coating of epoxy resin. The undercoating apparatus 123d forms an undercoat layer 115c comprising an adhesive undercoat to the outer surface of the filament bundle 115b by impregnating the filament bundle 115b with epoxy resin using nip rollers. The filament bundle 115b is then passed through elongation apparatuses 124b and 124c to elongate the filament bundle 115b in order to adjust the elongation thereof.

An RFL application process is then performed. The RFL application process forms an adhesive thin film 115d on the filament bundle 115b by impregnating the filament bundle 115b with an RFL adhesive solution using nip rollers after the filament bundle 115b has been dipped in an RFL tank 25b containing the RFL adhesive solution, and then drying the impregnated filament bundle 115b in a drying apparatus 125c. The RFL adhesive solution is a mixture of an aqueous solution of initial concentrate of resorcinol formaldehyde and rubber latex. The aqueous solution of initial concentrate can be prepared by inducing a reaction between 1 mol of resorcinol and 0.75–0.8 mol of formaldehyde in a base catalyst at close to room temperature. A base substance such as sodium hydroxide or ammonium hydroxide is preferred as the base catalyst. Natural rubber latex or synthetic rubber latex may be used as the above rubber latex material. If synthetic rubber latex is used, such latex may consist of styrene-butadiene copolymer rubber latex, vinylpyridine-butadiene-styrene copolymer rubber latex or the like.

Next, an EPDM application process is performed. In the EPDM application process, a rubber thin film 115e is formed over the adhesive thin film 115d by impregnating the filament bundle 115b to which the adhesive thin film 115d was applied by running it through nip rollers after it has been dipped in the EPDM tank 26b containing non-vulcanized EPDM, and then drying it using a drying apparatus 126c.

It is preferred that the amount of rubber thin film 115e equal 5–30% by weight of the total weight of the filament thread 115a. This is because if the weight is less than 5%, the effect of preventing abrasion or displacement of the filament threads is not sufficiently obtained due to contact friction between the strands of the lower yarn 115a, while if the weight exceeds 30%, elastic deformation due to the rubber layer becomes large, resulting in significant thread displacement.

(2)-3 Upper Yarn Layer 118

Figure 11:
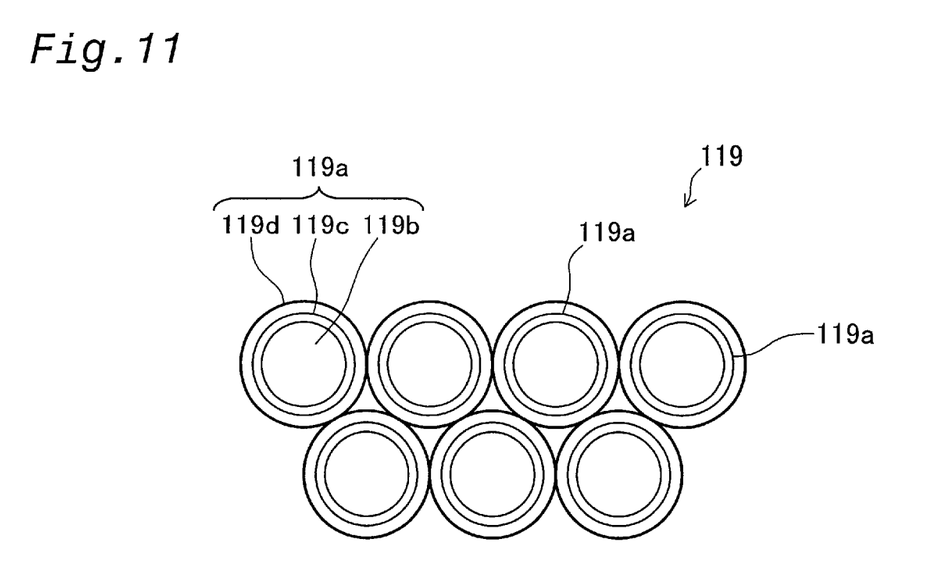
FIG. 11 is an expanded cross-section showing a part of the upper yarn.

The upper yarn layer 118 shown in FIG. 8 is formed by braiding the upper yarn 119. FIG. 11 is an expanded cross-section showing a part of the upper yarn 119. The upper yarn 19 is formed by bundling together 250–400 adhesive threads 119a. In other words, the adhesive threads 119a are made of polyethylene terephthalate, an undercoat layer 119c is formed by applying undercoating adhesive to the thread bundle, and an adhesive thin film 119d made of an RFL layer is formed over the undercoat layer 119c, thereby creating the upper yarn 118. The adhesive thin film 119d is an adhesive thin film layer that increases the adhesive force between the lower yarn layer 114 and the EPDM rubber of the cover rubber layer 120.

(2)-5 Cover Rubber Layer 120

Mainly in order to achieve ozone resistance, the cover rubber layer 120 shown in FIG. 8 is made of a material such as EPDM or a blend of EPDM and CR. The cover rubber layer 120 has a thickness of 0.5–1.0 mm.

(3) Brake Hose 110 Manufacturing Method

The manufacturing method for the brake hose 110 will now be described. The brake hose 110 can be manufactured using public-domain methods, i.e., by carrying out a rubber extrusion process, a fiber yarn braiding process and a vulcanization process.

(3)-1 Hose Manufacturing Apparatus 130

Figure 12:
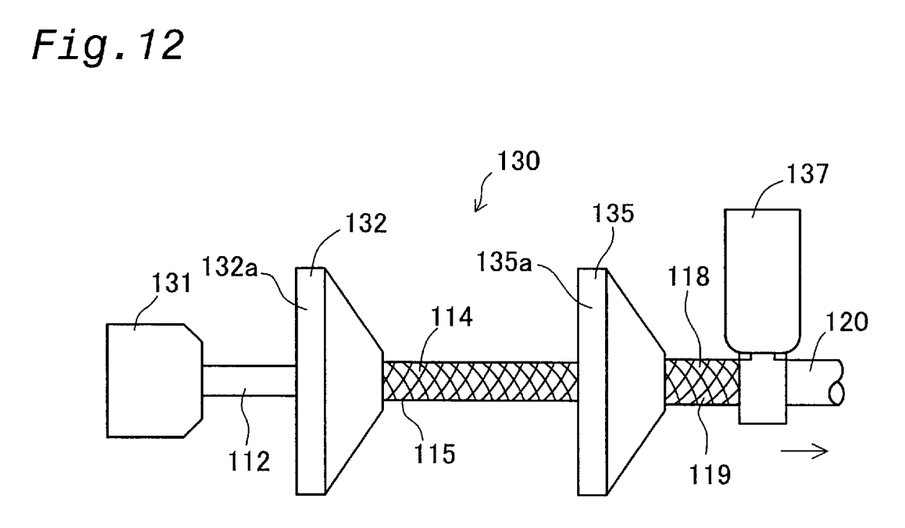
FIG. 12 shows a hose manufacturing apparatus.

FIG. 12 is an explanatory drawing to describe a hose manufacturing apparatus 130. The hose manufacturing apparatus 130 includes a first extruding device 131, a first braiding device 132, a second braiding device 135 and a second extruding device 137. The first extruding device 131 is a device that forms the inner tube rubber layer 112 by extruding a rubber material. The first braiding device 132 includes bobbin carriers mounted to a drum 132a, and forms the lower yarn layer 114 by braiding the lower yarn 115 around the inner tube rubber layer 112 while drawing it from the bobbin carriers. The second braiding device 135 has a construction essentially identical to that of the first braiding device 132. It includes bobbin carriers mounted to a drum 135a, and forms the upper yarn layer 118 by braiding the upper yarn 119 around the lower yarn layer 114 while drawing it from the bobbin carriers. The second extruding device 137 forms the cover rubber layer 120 by extruding a rubber material and covering the upper yarn layer 118 therewith.

(3)-2 Brake Hose 110 Manufacturing Process

The series of manufacturing steps by which the brake hose 110 is manufactured by the hose manufacturing apparatus 130 will now be described. First, the inner tube rubber layer 112 is formed via extrusion of a rubber material by the first extruding device 131. During this process, a mandrel (not shown in the figure) is inserted inside the inner tube rubber layer 112. Next, the lower yarn layer 114 is formed by drawing lower yarn 115 from the bobbins while the drum 132a of the first braiding device 132 is rotating and braiding the lower yarn 115 around the extruded inner tube rubber layer 112. During this process, in order to braid the lower yarn layer 114 to a braid count of 20, for example, the lower yarn 115 is drawn from bobbins that are located at 20 locations and rotate in opposite directions. The upper yarn layer 118 is then braided around the lower yarn layer 114 by drawing upper yarn 119 from the bobbins while the drum 135a of the second braiding device 135 is rotating. Finally, the cover rubber layer 120 is formed by extruding the rubber material used for the cover rubber layer 120 from the second extruding device 137 and forming it over the upper yarn layer 118.

The vulcanization process is then performed under normal conditions. For example, vulcanization is carried out for 15–60 minutes at 145–165° C. As a result of the vulcanization process, the inner tube rubber layer 112 and the rubber thin film 115e formed on the lower yarn 115 become bonded through normal vulcanization adhesion. In other words, the lower yarn 115 of the lower yarn layer 114 adheres to the rubber thin film 115e due to the heat applied during vulcanization via the adhesive thin film 115d formed by the RFL process. Consequently, the brake hose 110 is formed as a single unit.

(4) Brake Hose 110 Operation and Effect (4)-1 In the brake hose 110 described above, because the lower yarn layer 114 and the upper yarn layer 118 form two separate reinforcing layers inside the rubber base, the brake hose 110 can be made strong enough to withstand the high pressure exerted by the pressure fluid flowing in the flow path 111.

(4)-2 Because the brake hose 110 does not have an intermediate rubber layer formed around the lower yarn layer 114 like the brake hose of the conventional art, the process of forming the intermediate rubber layer can be omitted. As a result, the significant amount of floor space required for forming the intermediate rubber layer is no longer required.

(4)-3 Because the lower yarn 115 comprises approximately 250–400 filament threads 115a bound into a bundle, undergoes RFL processing via the undercoat layer 115c, and furthermore has a rubber thin film 115e, it adheres strongly to the inner tube rubber layer 112 via the rubber thin film 115e, and there is no displacement of the strands of the lower yarn 115. Moreover, because the unitary construction of the lower yarn layer 114 is promoted by the mutual adhesion of the strands of the lower yarn 115 caused by the vulcanization adhesion effect of the rubber thin film 115e, expansion of the inner tube rubber layer 112 from the pressure of the pressure fluid in the flow path is inhibited. In other words, the braking feel is improved due to the minimization of the amount of cubical expansion of the rake hose 110. Furthermore, the rubber thin film 115e strongly bonds to the epoxy fiber threads due to the RFL processing and the undercoat layer 119c.

Figure 13:
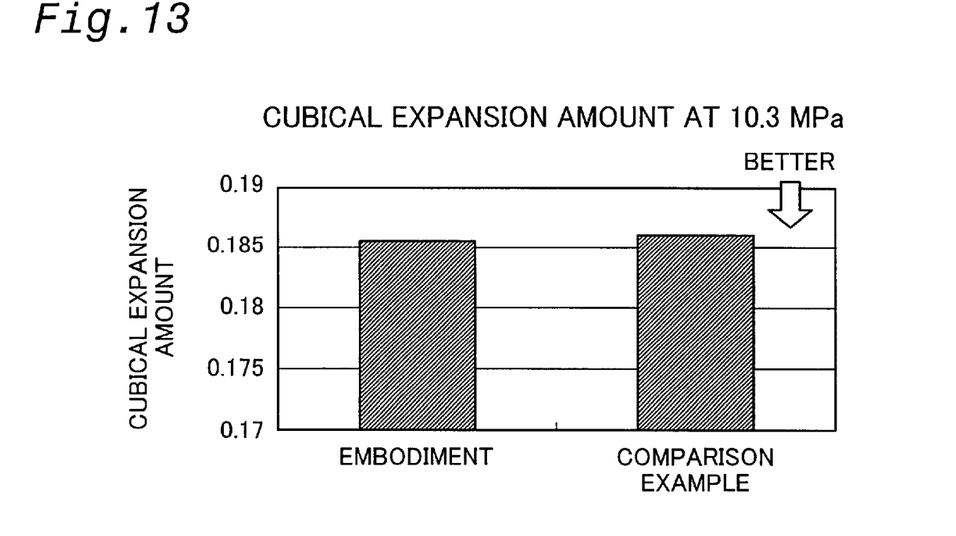
FIG. 13 is a graph showing the amount of cubical expansion in an embodiment and in a comparison example.
Figure 14:
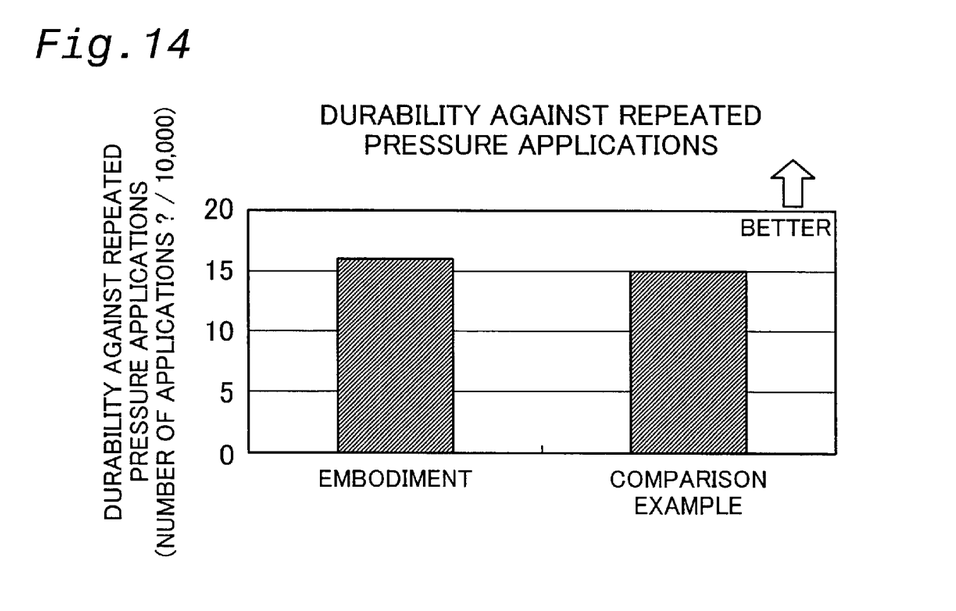
FIG. 14 is a graph showing pressure resistance in an embodiment and in a comparison example.

Testing to determine durability and the amount of cubical expansion of the brake hose was then performed. The results are shown in FIGS. 13 and 14. The brake hoses used in the embodiment and in the comparison example had an outer diameter of 10.5 mm, a length of 305 mm, an inner tube rubber layer inner diameter of 3.2 mm, an inner tube rubber layer thickness of 0.8 mm, and a cover rubber layer thickness of 0.8 mm. The lower yarn was made of polyethylene terephthalate fiber, while the upper yarn was made of vinylon fiber.

The cubical expansion test investigated the amount of volume fluctuation when fluid pressure of 10.5 MPa was applied. The durability test was carried out as follows: at room temperature, the brake hose was repeatedly injected with brake fluid at cycles of 0.3 Hz at a fluid pressure ranging from 0 MPa to 20 MPa, and the number of injections required for product burst was determined.

From the results of the tests, it was determined that the embodiment offered performance that was equal or superior to that provided by the comparison example representing the conventional art.

Figure 15:
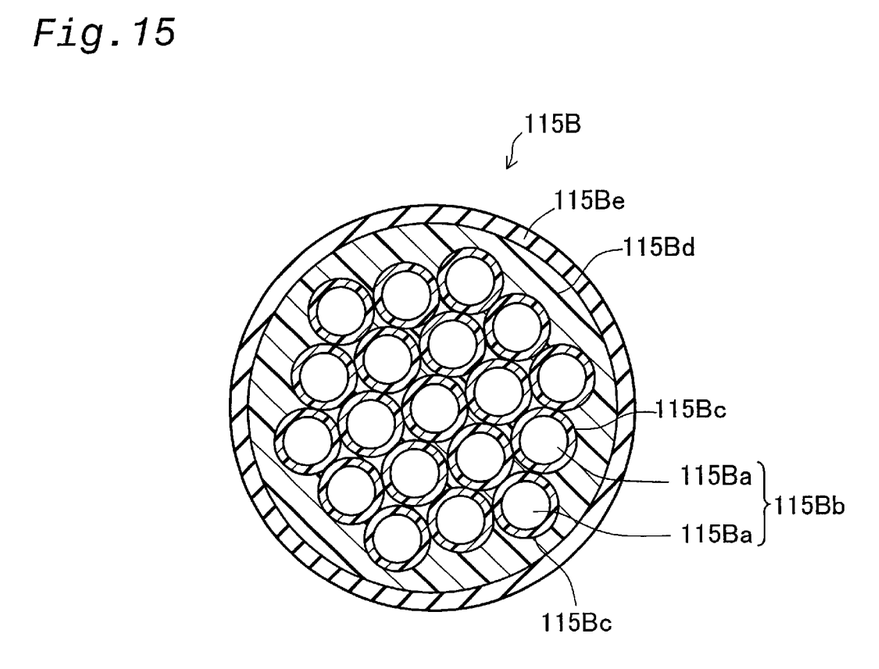
FIG. 15 is a cross-section showing the lower yarn pertaining to another embodiment of the present invention.

FIG. 15 is an explanatory drawing to describe the lower yarn 115B pertaining to another embodiment of the present invention via a cross-section thereof. The lower yarn 115B is characterized in that rather than having an undercoat layer formed over the outer surface of the filament bundle 115Bb, an undercoat layer 115Bc is formed over each individual filament thread 115Ba. In other words, the lower yarn 115B comprises a filament bundle 115Bb composed of 250–400 filament threads 115Ba that are bundled together. The undercoat layer 115Bc is applied to the outer surface of each individual filament thread 115Ba. The filament bundle 115Bb is formed by bundling together these filament threads 115Ba, and an adhesive thin film 115Bd and a rubber thin film 115Be are then sequentially formed over the filament bundle 115Bb. When the lower yarn 115B is manufactured, the undercoat layer 115Bc is formed immediately after the filament threads 115Ba are extruded, the filament bundle 115Bb is formed by bundling these filament threads 115Ba, and the adhesive thin film 115Bd formed via RFL processing and the rubber thin film 115Be are thereafter formed sequentially over the coated filament bundle 115Bb. This lower yarn 115B provides the same operation and effect as the embodiments described above.

This invention is not limited to the above embodiments, and may be implemented in various ways within the essential scope of the invention. For example, the variation described below may be applied.

In the above embodiments, the rubber thin film was formed only over the yarn of the lower yarn layer, but it is acceptable if a rubber skin layer is formed over the upper yarn in the same fashion.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A brake hose including two reinforcing layers in a rubber base, the brake hose comprising:

an inner tube rubber layer having a flow path for flowing fluid;

a lower yarn layer formed by braiding first yarns around the inner tube rubber layer;

an upper yarn layer formed by braiding second yarns around the lower yarn layer; and a cover rubber layer covering the upper yarn layer;

wherein a lower yarn layer duty LD given by the equation, LD(%)=(LRP/PRP)×100, has a value of 50–65%, LRP denotes an inner pressure at which a brake hose without the upper yarn layer and the cover would burst, and PRP denotes an inner pressure at which the brake hose would burst.

2. The brake hose according to claim 1, wherein the second yarns have elongation lower than the first yarns.

3. The brake hose according to claim 2, wherein the first yarns are formed of yarns having a tensile strength of 6.5 g or more per decitex and a elongation of 3.5±1% at a tensile load of 2.7 g.

4. The brake hose according to claim 3, wherein the first yarns are made from fiber threads of a material selected from a group including vinylon, polyethylene terephthalate, polyethylene naphthalate and rayon.

5. The brake hose according to claim 2, wherein the second yarns as a tensile strength of 8.5 g or more per decitex and a elongation of 3.0±1% at a tensile load of 2.7 g.

6. The brake hose according to claim 5, wherein the second yarns is made from fiber threads of a material selected from a group including vinylon, polyethylene terephthalate, polyethylene naphthalate and rayon.

7. The brake hose according to claim 1, further comprising an intermediate rubber layer between the lower yarn layer and the upper yarn layer.

8. The brake hose according to claim 7, wherein the intermediate rubber layer is made of a rubber material having a Mooney viscosity of 10–40 Mv at 145° C.

9. The brake hose according to claim 8, wherein the Mooney viscosity is adjusted by changing an amount of constituent carbon.

10. The brake hose according to claim 7, wherein the intermediate rubber layer has a thickness of 0.1–0.25 mm.

11. The brake hose according to claim 10, wherein the intermediate rubber layer is formed from a sheet material.

12. The brake hose according to claim 7, wherein the intermediate rubber layer is formed by repeatedly applying liquid rubber to the lower yarn layer and curing the liquid rubber.

13. The brake hose according to claim 7, wherein the intermediate rubber layer is made of a material selected from a group including EPDM and a blend that includes EPDM and IIR.

* * * * *